April 14, 1959 E. C. LISTON 2,881,848
SOIL TREATMENT APPLICATORS
Filed April 2, 1956
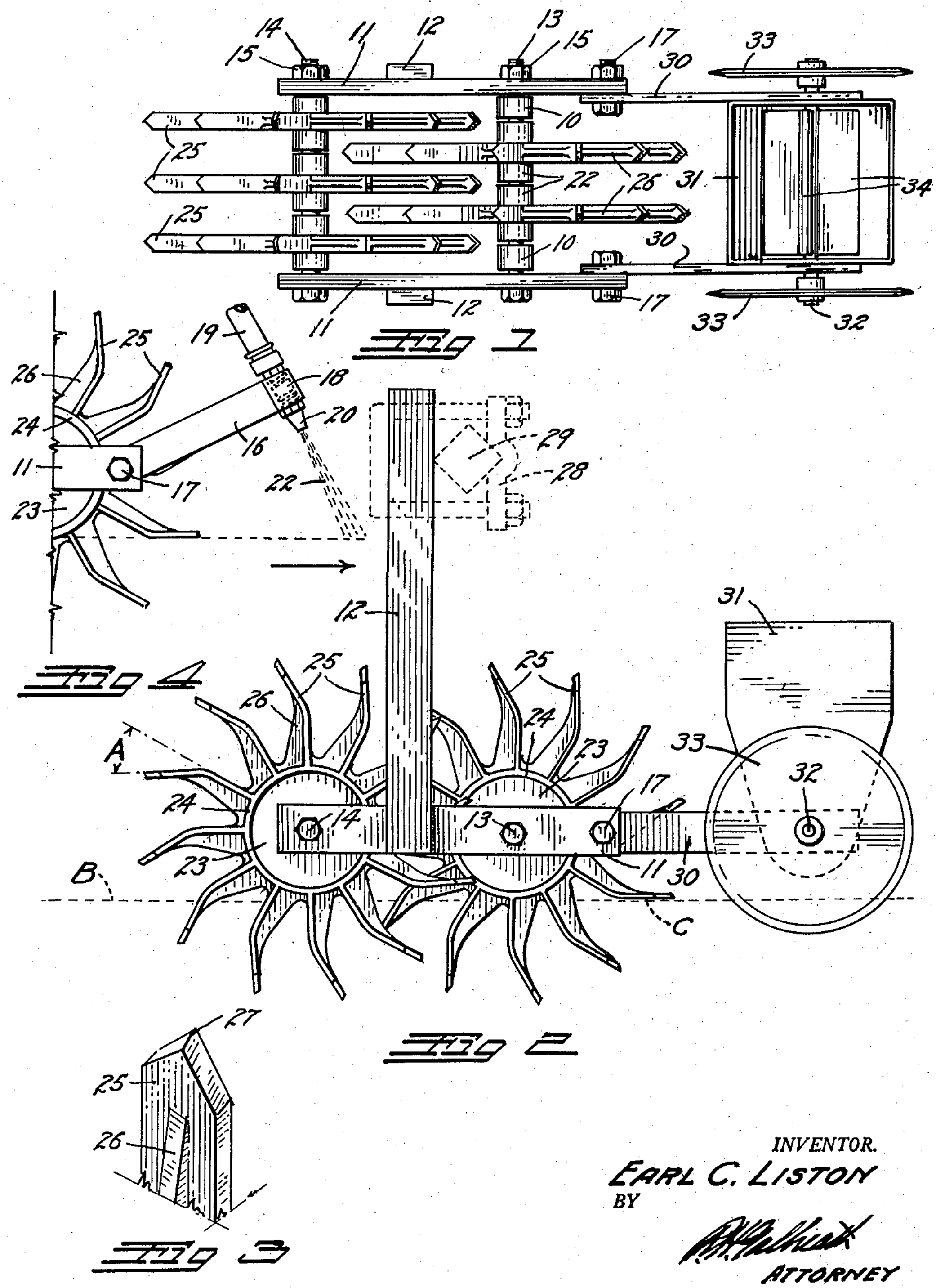
INVENTOR.
EARL C. LISTON
BY
ATTORNEY United States Patent Office 2,881,848

Patented Apr. 14, 1959

2,881,848

SOIL TREATMENT APPLICATORS

Earl C. Liston, Englewood, Colo., assignor to Howry-Berg Steel & Iron Works, Inc., Englewood, Colo., a corporation of Colorado Application April 2, 1956, Serial No. 575,580

1 Claim. (Cl. 172—555)

This invention relates to a soil treatment applicator and tilling tool for attachment to an agricultural implement such as a cultivator or planter for use in applying herbicides, insecticides, fungicides, fertilizers, and plant foods to the soil and intimately intermixing the solution with the soil.

The principal object of the invention resides in the provision of an exceedingly simple and highly efficient tool for the above purpose, and to so construct the tool that a plurality of the tools can be quickly and easily mounted on a cultivator or planter for operation on any desired number of plant rows, and to provide a tool which will serve both to support an applicator for applying ribbon-like bands of soil chemicals to the ground surface in alignment with the plant rows, and to break up and submerge the chemically treated surface soil and intimately intermix the chemically impregnated soil with the remainder of the top soil in the row so that maximum results may be obtained from the chemical application.

With the usual methods of soil treatment, the ground surface is moistened with a spray solution or covered with chemical dust over a relatively wide area. The chemicals do not penetrate deeply into the soil, and but a very small proportion of the entire application reaches the seeds and plants in the rows for which the application is intended. The result is a great loss in chemicals and a minimum of beneficial results. Another object of the present invention is to provide a soil tiller which will apply the soil treatment chemicals only in a narrow ribbon or band along the top of each plant row and immediately force the chemically treated top earth into the soil of the row so that maximum results will be attained with a minimum of loss of chemicals.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a top view of one of the improved soil treatment applicators arranged for applying powdered soil treatment chemicals to the soil;

Fig. 2 is a side view thereof;

Fig. 3 is an enlarged, fragmentary, perspective view illustrating the design of a tooth point employed on the improved tool; and Fig. 4 is a fragmentary side view illustrating the invention arranged for applying a spray solution to the soil.

In actual use a plurality of the tools would be employed, one for each plant row. The tillers would be attached to the tool bar of a conventional cultivator or planter by means of the usual tool clamps. The position of such a tool bar is indicated in broken line at 29 in Fig. 2, and the position of such a clamp is similarly indicated at 28. Each of the tools would be similar to the tool illustrated herein.

The improved tool employs two inverted, T-shaped side frames, each consisting of a horizontal side frame bar 11 to which a vertical riser bar or tool post 12 is permanently affixed by welding or other suitable attachment means. The tool posts 12 are designed to be clamped to the tool bar 29 of any desired implement, such as a cultivator, planter, grain drill or the like, by means of the conventional clamps 28, similarly to the manner of attachment of the usual cultivating plows, shoes, points, etc.

A forward axle bolt 13 and a rear axle bolt 14 extend between the side frame bars 11 and are secured therein by means of suitable nuts 15. A plurality of similar, specially shaped cultivator wheels are rotatably mounted on each of the bolts 13 and 14, the forward bolt 13 being provided with two of these cultivator wheels, and the rear bolt 14 being provided with three of the wheels. The wheels on the two bolts are positioned in staggered, overlapping relation, as shown in Fig. 1. Spacing sleeves 10 are employed on the front bolt 13 to properly position the front wheels intermediate the rear wheels.

For spraying uses a U-shaped nozzle yoke 16 is secured to the forward extremities of the side bars 11 by means of suitable clamp bolts 17. The nozzle yoke 16 is provided with a vertically positioned, internally threaded pipe coupling 18 welded or otherwise secured thereto at the forward mid-portion thereof. In use, the terminal nipple of a spray solution hose 19 is threaded into the upper end of the coupling 18, and a solution spray nozzle 20 is threaded into the lower end of the coupling 18. The nozzle is of a type to produce a flat, fan-shaped spray of a width to cover the width of the plant row. The elevation and angle of the nozzle 20 can be varied by varying the angular position of the yoke 16 about the axis of the clamp bolts 17 to project a solution spray 21, as indicated in broken line in Fig. 4.

Each of the improved cultivator wheels comprises a tubular hub portion 22 surrounded by a circular disc 23 terminating in an oppositely projecting, annular rim flange 24. A plurality of teeth 25 project from the annular rim flange 24. The axial portions of the teeth 25 extend radially from the rim flange 24 in uniformly spaced relation for a distance of substantially one-half their length. The circumferential portions of the teeth 25 are thence inclined at an acute angle to the radial portions thereof, as indicated by the angle A in Fig. 2, and the latter portions lie in planes tangent to the circumference of the annular rim flange 24. Each tooth 25 is strengthened by means of a tapered web 26 which is cast integrally with one side of each tooth. The opposite sides of the teeth are substantially flat and smooth.

In Fig. 2 the approximate position of the ground surface when the tiller is in use is indicated by the broken line B. It will be noted that the teeth enter the ground sufficiently to bring the rim flanges 24 of the wheels approximately tangent to the ground surface. It will also be noted that the angle A of the teeth is such that when the teeth contact the ground surface, they will be substantially flat and parallel to the surface, as shown at C in Fig. 2, and that when at their greatest depth, they will be positioned substantially at right angles to the direction of travel, as shown by the lowermost teeth in Fig. 2. Each tooth 25 is sharpened to form a beveled entering point 27, as shown in Fig. 3, so that the tooth may be forced into the ground with a minimum of power consumption. It is preferred that the diameter of the wheel discs 23 equal approximately one-third the diameter of the complete wheel.

Let us assume that the tools are moving forwardly along the plant rows in the direction of the arrow in Fig. 2 over the ground surface B. The sprays 21 will wet a path along each row and the flat terminal portions of the teeth will be pressed against this wet path, as shown at C, and the dampened surface soil will be pressed downwardly into the row to form packed moist clods which are intermixed with the lower layer of soil therein. The pressing energy is obtained from those teeth which are embedded in the soil at substantially right angles to the direction of travel. As the terminal portions of the teeth leave the ground, it will be noted they rise straight up so as not to disturb the packed moist clods. The result is that a relatively deep channel of chemically moistened, loosened, intermixed soil is formed along each row, leaving the soil in perfect growing condition without surface crust.

It will be noted that the height of the spray from the ground surface and the angle of the spray can be adjusted by loosening the bolts 17 and varying the angle of incline of the yoke 16. Tightening of the bolts 17 will fixedly clamp the yoke in the desired preset angle.

The improved tool is also applicable for applying dry, granulated, or powdered chemicals to the soil. This is accomplished by removing the nozzle yoke 16 and securing two hopper arms 30 in place on the bolts 17. The hopper arms 30 extend forwardly and support a dry chemical hopper 31 having an arcuate bottom provided with discharge openings or ports for discharging a powdered chemical. An agitator shaft 32 extends transversely of the hopper 31 axially of the arcuate bottom thereof. A ground-engaging disc 33 is mounted on each extremity of the shaft 32, and four paddles or agitating blades 34 are secured on the shaft 32 within the hopper 31.

As the tool travels forward the discs will rotate the shaft 32, causing the blade 34 to sweep past the discharge ports to deposit a band of dry chemical along the plant row in advance of the cultivator wheels. The discs 33 not only act to rotate the shaft 32, but also serve to confine the powdered chemical to a restricted band along the plant row to avoid waste and obtain maximum results.

While a specific form of the improvement has been described and illustrated herein, it is desired to be understood that the same may be varied, within the scope of the appended claim, without departing from the spirit of the invention.

Having thus described the invention, what is claimed and desired secured by Letters Patent is:

A wheel for pressing surface-treated soil downwardly for embedding areas thereof comprising: a tubular hub portion, a circular disc concentrically surrounding said hub portion, a circular rim circumferentially surrounding said disc and projecting equally beyond both faces thereof, a plurality of circumferentially spaced teeth projecting from said rim and being of a width equal to that of the rim, said teeth each comprising an inner flat portion disposed radially of said rim and an outer flat portion disposed in a plane tangential of said rim, said inner and outer portions being connected through an arcuate portion, said inner and outer tooth portions being so angularly disposed in relation to each other that upon drawing the wheel forwardly with certain teeth thereof embedded in the soil, with the rim resting on the ground surface, the outer flat portions of the teeth will successively engage the ground surface throughout the certain areas in advance of the respective radial portions so as to depress areas of said surface-treated soil below the ground surface, and reinforcing webs rigid with said rim and the rear walls of said teeth.

References Cited in the file of this patent

UNITED STATES PATENTS

| | | |
|---|---|---|
| 335,966 | Shaw | Feb. 9, 1886 |
| 367,989 | Mallon | Aug. 9, 1887 |
| 1,571,481 | Kasmeier | Feb. 2, 1926 |
| 1,847,327 | Bateman | Mar. 1, 1932 |
| 2,388,553 | Kraus | Nov. 6, 1945 |
| 2,617,343 | Warne | Nov. 11, 1952 |
| 2,754,622 | Rohnert | July 17, 1956 |